United States Patent
Miyazawa et al.

(10) Patent No.: US 8,005,969 B2
(45) Date of Patent: Aug. 23, 2011

(54) COMMUNICATION SYSTEM FOR ESTABLISHING HIGHER SECURITY COMMUNICATION AND SERVER AND COMPUTER READABLE MEDIUM THEREFOR

(75) Inventors: Masafumi Miyazawa, Nagoya (JP); Naoki Otsuka, Konan (JP); Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 540 days.

(21) Appl. No.: 11/860,390

(22) Filed: Sep. 24, 2007

(65) Prior Publication Data

US 2008/0082677 A1    Apr. 3, 2008

(30) Foreign Application Priority Data

Sep. 29, 2006  (JP) .................. 2006-268626

(51) Int. Cl.
    *G06F 15/16*    (2006.01)
(52) U.S. Cl. ........ 709/229; 370/356; 370/401; 370/466; 455/69; 705/44; 709/224; 710/8; 713/151; 713/156; 713/171; 713/173; 726/1
(58) Field of Classification Search .......... 709/229
    See application file for complete search history.

(56) References Cited

U.S. PATENT DOCUMENTS

| 6,178,454 | B1 | 1/2001 | Tsuneyoshi et al. |
| 6,868,455 | B1* | 3/2005 | Ariyama .................. 710/8 |
| 7,209,965 | B2* | 4/2007 | Sato ..................... 709/224 |
| 2002/0073310 | A1* | 6/2002 | Benantar ................ 713/156 |
| 2003/0130947 | A1* | 7/2003 | Benantar ................. 705/44 |
| 2004/0107345 | A1* | 6/2004 | Brandt et al. ........... 713/171 |
| 2004/0184479 | A1* | 9/2004 | Yamauchi et al. ........ 370/466 |

(Continued)

FOREIGN PATENT DOCUMENTS

JP    H11-025046 A    1/1999

(Continued)

OTHER PUBLICATIONS i-mode (on-line), Internet Archive—http://web.archive.org/web/*/http://www2.docomo-hokuriku.co.jp/manual/pdf/d901i/D901i_J_08.pdf; pp. 198-240, Mar. 29, 2005 (Note; concise explanation of relevance provided in attached Japanese Patent Office, Notification of Reasons of Rejection).

(Continued)

*Primary Examiner* — Aaron Strange
*Assistant Examiner* — Tobias J Casaw
(74) *Attorney, Agent, or Firm* — Baker Botts L.L.P.

(57) ABSTRACT

A communication system includes a server and at least one client. The server includes a first communication unit that performs first communication with each client based on a first protocol, a second communication unit that performs second communication with each client based on a second protocol, an information receiving unit that receives first information with the first communication unit, an information extracting unit that extracts second information, a judging unit that judges whether the second communication is feasible based on the first and second information, and a command sending unit that sends a command for issuing a request for establishing the second communication when the second communication is feasible. Each client includes an information sending unit that sends the first information, a command receiving unit that receives the command, and a request sending unit that issues the request to the first communication unit in response to the command.

17 Claims, 8 Drawing Sheets

U.S. PATENT DOCUMENTS

| | | | | |
|---|---|---|---|---|
| 2004/0252679 A1* | 12/2004 | Williams et al. | | 370/356 |
| 2006/0031922 A1* | 2/2006 | Sakai | | 726/1 |
| 2006/0106929 A1* | 5/2006 | Kenoyer et al. | | 709/224 |
| 2006/0155984 A1* | 7/2006 | Tsuchida et al. | | 713/156 |
| 2007/0238417 A1* | 10/2007 | Bennett | | 455/69 |
| 2007/0286215 A1* | 12/2007 | Morris | | 370/401 |
| 2008/0077796 A1* | 3/2008 | Lund et al. | | 713/173 |
| 2008/0195858 A1* | 8/2008 | Nguyen | | 713/151 |

FOREIGN PATENT DOCUMENTS

| | | |
|---|---|---|
| JP | 2005-020114 A | 1/2005 |
| JP | 2006-115379 A | 4/2006 |

OTHER PUBLICATIONS

Japanese Patent Office, Notification of Reasons of Rejection for Application No. 2006-268626, dispatched on Oct. 28, 2008.

* cited by examiner

GET /webmain/ HTTP/1.1
Host: printer01. xxx. net
User-Agent: WebBrower1.1
Accept: text/xml, application/xml, application/xhtml+xml, text/html;q=0.9, text/plain;q=0.8, image/png, * / *; q = 0.5
Accept-Language: ja, en-us;q=0.7, en;q=0.3
Accept-Encoding: gzip, deflate
Accept-Charset: Shift_JIS, utf-8;q=0.7,  *; q = 0.7
Keep-Alive: 300
Cert-Issuer-Info: C=jp, ST=xxx, L=yyy, O=zzz, OU=www, CN=ca1      ,61

FIG.8A

HTTP/1.1 302 Moved Temporarily
Date: Fri, xx yyy 2006 06:00:00 GMT
Server: printer web server 1.1      ,62
Location: https://printer01. xxx. net/webmain/
Connection: close
Content-Type: text/html

FIG.8B

COMMUNICATION SYSTEM FOR ESTABLISHING HIGHER SECURITY COMMUNICATION AND SERVER AND COMPUTER READABLE MEDIUM THEREFOR

CROSS-REFERENCE TO RELATED APPLICATION

This application claims priority under 35 U.S.C. §119 from Japanese Patent Application No. 2006-268626, filed on Sep. 29, 2006. The entire subject matter of the application is incorporated herein by reference.

BACKGROUND

1. Technical Field

The following description relates to one or more communication techniques for establishing secure communication between a server and a client.

2. Related Art

As a communication technology employed for communication between a plurality of devices on a network, an SSL (Secure Socket Layer) communication technology has been known in which the communication is switched to encrypted communication by transmitting a public key using an electronic certificate. Such encrypted communication is not used even in a communication system configured to perform the encrypted communication unless a user indicates his intention of using the encrypted communication at a computer side. In other words, low security communication might be performed even in the communication system configured to perform the encrypted communication due to an improper communication protocol selected by the user at the computer side.

As a conventional technology to solve the above problem, there has also been known a technology in which a computer connected with two networks of different security levels can switch to connection with a higher-security one of the networks when performing communication of high secrecy information (see Japanese Patent Provisional Publication No. HEI 11-25046).

SUMMARY

However, when electronic certificates are mutually requested in the SSL communication between a server and a client computer, the communication cannot be maintained unless the client computer has a certificate signed by a CA (Certificate Authority) of a CA certificate provided to the server. Therefore, when the server, which has received a request for start of communication from the client computer, always tries to switch to the connection with the higher-security network, the client computer might not maintain the communication.

Aspects of the present invention are advantageous in that there can be provided one or more improved communication techniques that make it possible to certainly perform communication using a communication protocol with as high security as possible.

According to aspects of the present invention, there is provided a communication system including a server and at least one client, which is capable of establishing high-security communication between the server and the at least one client. The server includes a first communication unit configured to perform first communication with the at least one client based on a first protocol, a second communication unit configured to perform second communication with the at least one client based on a second protocol with higher security than the first protocol, an information receiving unit configured to receive first information for judging feasibility of the second communication from the at least one client with the first communication unit, an information extracting unit configured to extract second information for judging the feasibility of the second communication from information stored in the server, a judging unit configured to judge whether the second communication between the server and the at least one client is feasible based on the first information and second information, and a command sending unit configured to send, to the at least one client, with the first communication unit, a command to instruct to send a request for establishing the second communication when the judging unit judges that the second communication between the server and the at least one client is feasible. Each of the at least one client includes an information sending unit configured to send the first information to the first communication unit, a command receiving unit configured to receive the command sent by the command sending unit, and a request sending unit configured to send, to the first communication unit, the request for establishing the second communication in response to the command received by the command receiving unit.

According to another aspect of the present invention, there is provided a server usable in a communication system configured to establish high-security communication between the server and at least one client, the server including a first communication unit configured to perform first communication with the at least one client based on a first protocol, a second communication unit configured to perform second communication with the at least one client based on a second protocol with higher security than the first protocol, an information receiving unit configured to receive first information for judging feasibility of the second communication from the at least one client with the first communication unit, an information extracting unit configured to extract second information for judging the feasibility of the second communication from information stored in the server, a judging unit configured to judge whether the second communication between the server and the at least one client is feasible based on the first information and second information, and a command sending unit configured to send, to the at least one client, with the first communication unit, a command to instruct to send a request for establishing the second communication when the comparing unit judges that the first information is identical to the second information.

According to a further aspect of the present invention, there is provided a computer usable medium having computer readable instructions stored thereon that cause a computer, which includes a first communication unit configured to perform first communication with at least one external device based on a first protocol and a second communication unit configured to perform second communication with the at least one external device based on a second protocol with higher security than the first protocol, to perform steps of receiving first information for judging feasibility of the second communication from the at least one external device with the first communication unit, extracting second information for judging the feasibility of the second communication from information stored therein, judging whether the second communication between the server and the at least one external device is feasible based on the first information and second information, and sending, to the at least one external device, with the first communication unit, a command to instruct to send a request for establishing the second communication when it is judged that the second communication between the server and the at least one external device is feasible.

According to some aspects, when a client begins to perform the first communication with the server based on the first protocol, the client sends the first information for judging the feasibility of the second communication. Accordingly, the server can judge whether the second communication between the server and client can be performed based on the second protocol with higher security than the first protocol. Hence, when it is judged that the second communication is feasible, the second communication can be performed based on the second protocol to ensure higher security. Meanwhile, unless it is judged that the second communication is feasible, the first communication based on the first protocol can be maintained. Namely, it is possible to certainly perform communication between the server and client based on a protocol with as high security as possible.

BRIEF DESCRIPTION OF THE ACCOMPANYING DRAWINGS

FIG. 1 schematically shows a configuration of a communication system in an embodiment according to one or more aspects of the present invention.

FIG. 8A is an example of a header of a request for an HTTP-based connection in the embodiment according to one or more aspects of the present invention.

FIG. 8B is an example of an HTTP response for instructing redirection to an HTTPS port in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Figure 1:
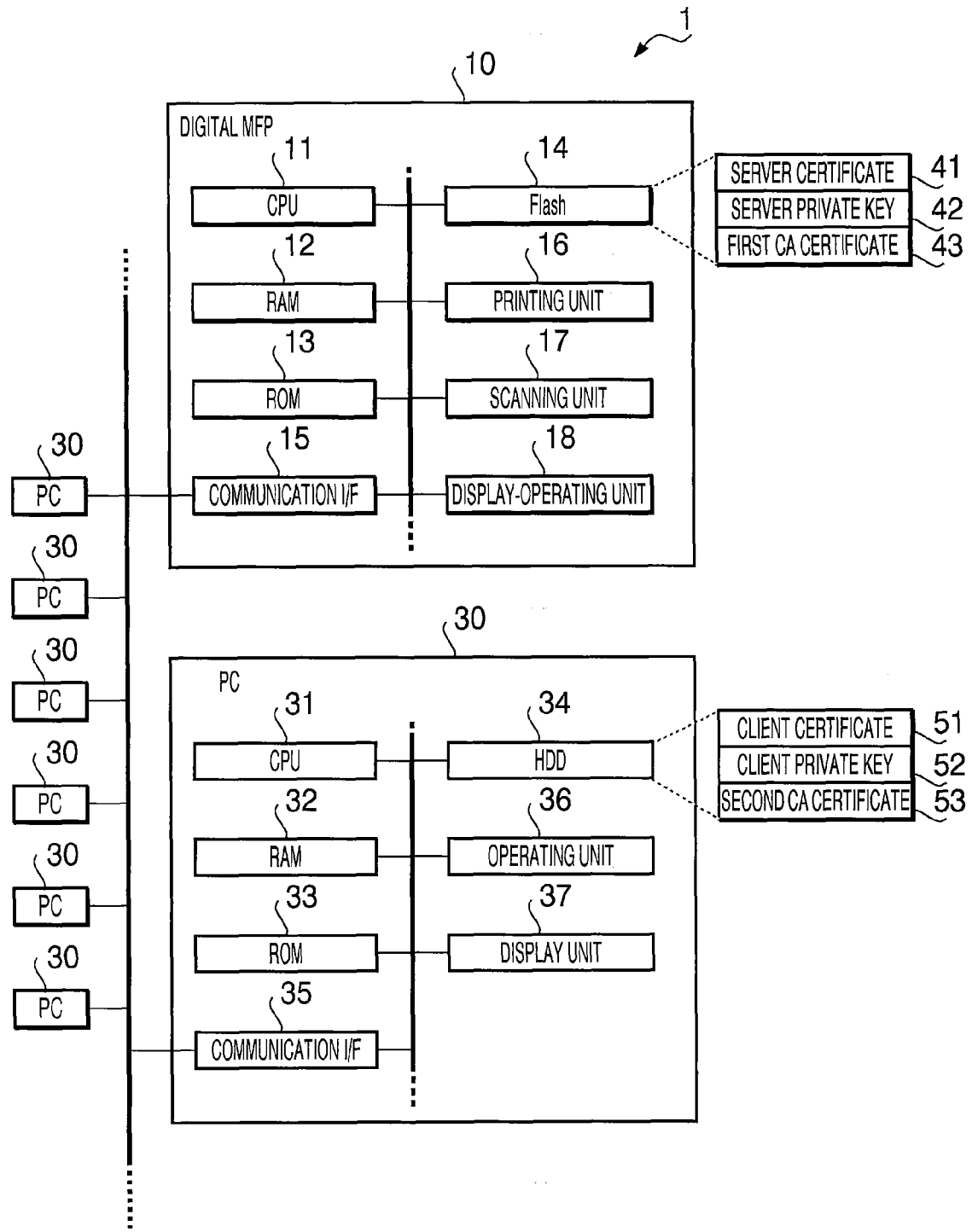

Hereinafter, an embodiment according to aspects of the present invention will be described with reference to the accompanying drawings. FIG. 1 schematically shows a configuration of a communication system 1 in the embodiment. As shown in FIG. 1, the communication system 1 is configured with a digital MFP (Multi Function Peripheral) 10 as a server and personal computers (hereinafter, simply referred to as "PCs") 30 as clients being connected with a TCP/IP network.

The digital MFP 10 includes a CPU 11, RAM 12 as a work memory, ROM 13 and flash memory 14 that store therein various programs and data, communication interface (I/F) 15 connected with the TCP/IP network, printing unit 16 that forms an image onto a paper with a laser printing method or an inkjet printing method, scanning unit 17 that optically reads out an original placed on a stage, and display-operating unit 18 as a user interface including various user-operable keys and a display unit.

The CPU 11 is configured to execute various programs stored in the ROM 13 so as to actualize a printer function, scanner function, copy function, and other control functions. For example, when receiving printing data from an external PC 30 through the communication interface 15, the CPU 11 controls the printing unit 16 to form a printing image onto the paper based on the received printing data (printer function). In addition, when a scanning command is inputted with the display-operating unit 18 being operated by a user, the CPU 11 controls the scanning unit 17 to generate image data corresponding to an image obtained by scanning the original on the stage and transmit the generated image data to a predetermined PC 30 via the communication interface 15 (scanner function).

In addition to the aforementioned functions, the digital MFP 10 has a web server function and an SSL (Secure Socket Layer) communication function.

Further, the digital MFP 10 is configured to certificate a client (PC 30) with an electronic certificate when accepting an access to a specified port thereof from the PC 30. Therefore, there are stored in the flash memory 14 a server certificate 41, server private key 42, and first CA (Certificate Authority) certificate 43 as described below.

Each PC 30 is configured in the same manner as a widely known personal computer, and can perform the SSL communication by executing various program with a CPU 31. Specifically, the PC 30 is provided with the CPU 31, a RAM 32 as a work memory, a ROM 33 with a boot program stored therein, a hard disk drive (HDD) 34, a communication interface 35 connected with the TCP/IP network, an operating unit 36 including a keyboard and pointing device, and a display unit 37 including a liquid crystal display (LCD).

There are stored in the HDD 34, as described later, a client certificate 51, client private key 52, and second CA certificate 53. Further, there are stored in the HDD 34 a browser as software for using the web server function of the digital MFP 10 and a printer driver for using the printer function of the digital MFP 10. The SSL communication is employed by the browser and printer driver.

Figure 2:
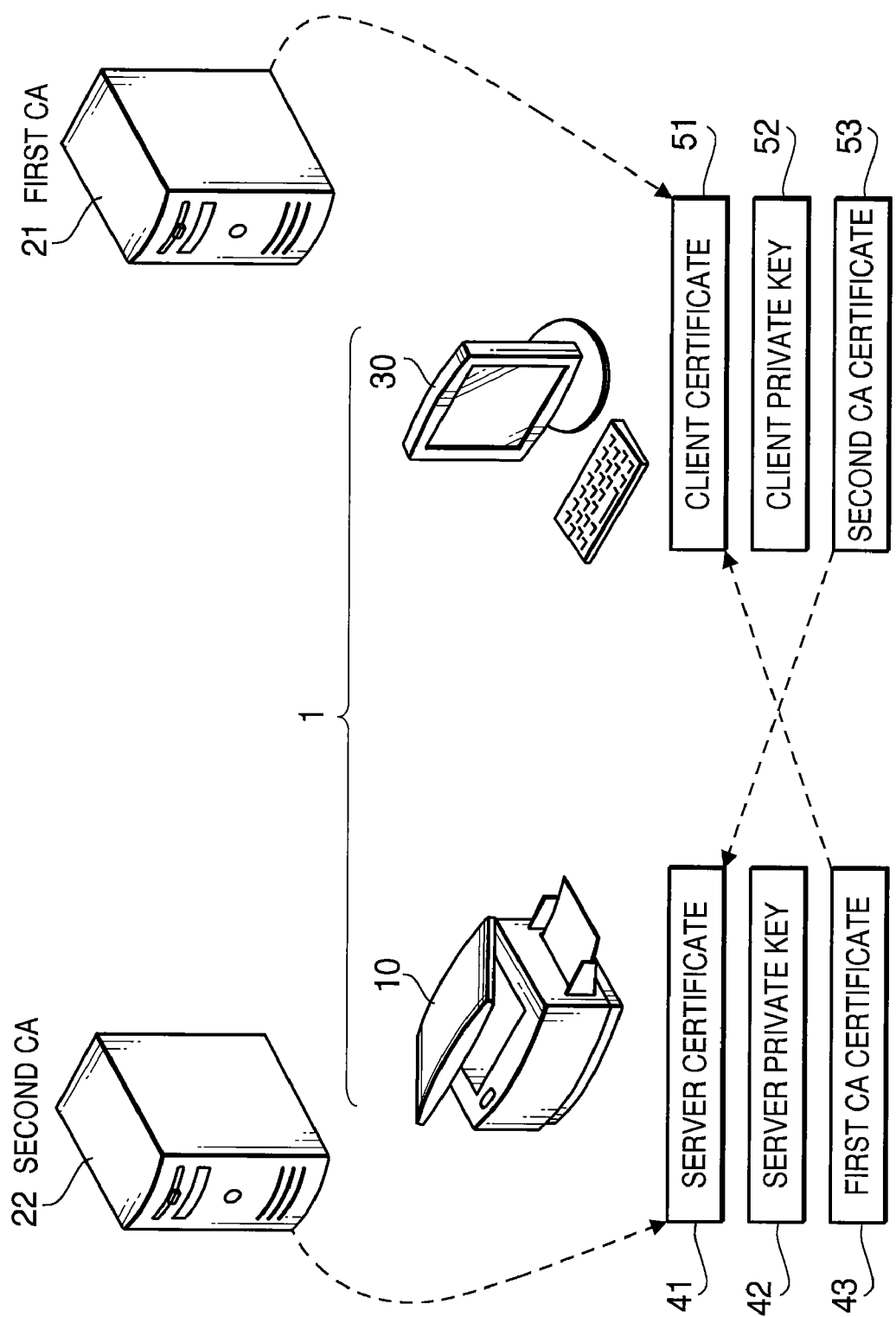
FIG. 2 is an illustration showing a signature relationship in the communication system in the embodiment according to one or more aspects of the present invention.

FIG. 2 is an illustration for explaining a signature relationship in the communication system of the embodiment. In the communication system 1, the server (MFP 10) is provided with the server certificate 41 for verifying itself therewith, server private key 42, and first CA certificate 43 for verifying the client certificate 51. The server certificate 41A is signed by a second CA 22.

Figure 4A:
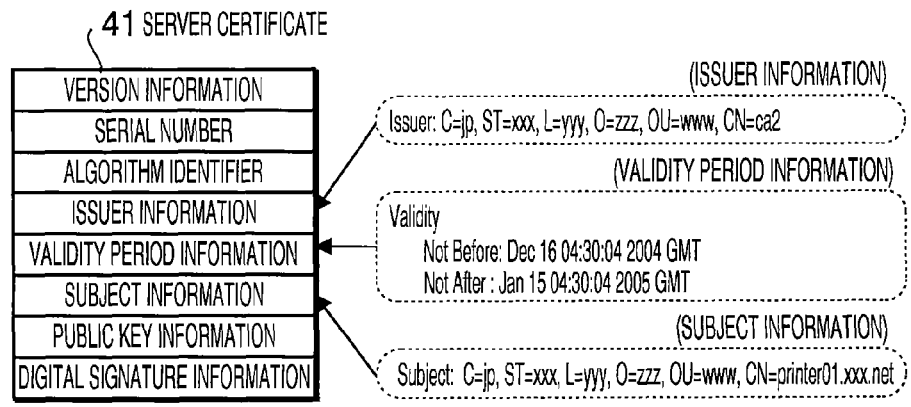
FIGS. 4A to 4D are illustrations showing configurations of a server certificate, client certificate, first CA (Certificate Authority) certificate, and second CA certificate, respectively, in the embodiment according to one or more aspects of the present invention.

As shown in FIG. 4A, the server certificate 41 includes version information representing a version of the certificate, a serial number of the certificate, an algorithm identifier, issuer information representing an issuer of the certificate who has given a digital signature, validity period information representing a period of validity for the certificate, subject information representing an owner of the certificate, public key information representing a public key of the owner, and digital signature information representing a digital signature value. Further, the subject information of the server certificate 41 has a host name and domain information of the digital MFP 10, and the validity period information is configured to represent a start time and an end time (the expiration date) of the period of validity for the certificate. The digital signature information is created with a private key of the second CA 22 (see FIG. 2).

The server private key 42 is used for verifying the server between the server and client, and for sharing a session key (common key) employed in the encrypted communication as established.

Figure 4B:
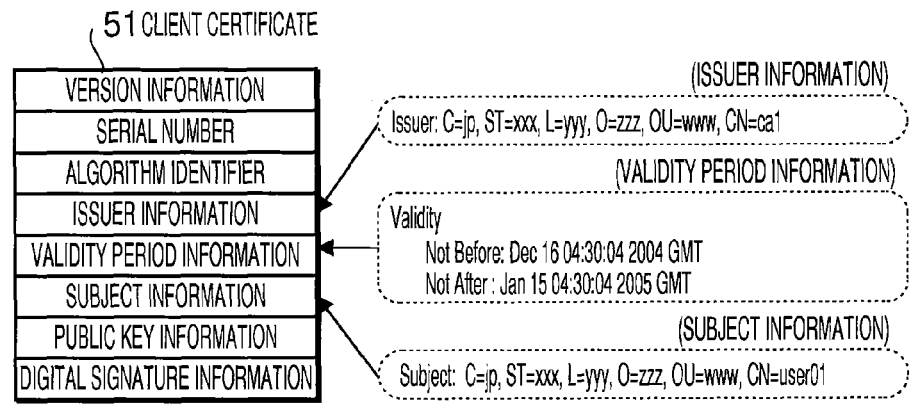
Figure 4C:
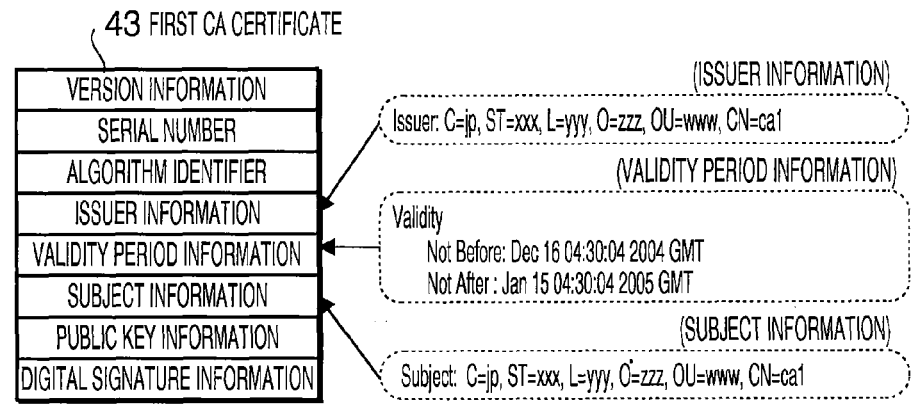

The first CA certificate 43 is a certificate for verifying the client certificate 51 signed by the first CA certificate 21, and has contents as shown in FIG. 4C. The first CA certificate 43 includes the same kinds of information as the server certificate 41. The first CA certificate 43 is configured to verify digital signature information of the client certificate 51 with a public key of the first CA 21 included in the first CA certificate 43, a validity period, and subject information so as to certificate the client (PC 30).

The PC 30 as a client has the client certificate 51 for verifying itself, client private key 52, and second CA certificate 53. As shown in FIG. 4B, the client certificate 51 has the same kinds of information as the server certificate 41. Digital signature information of the client certificate 51 is created with a private key of the first CA 21.

The client private key 52 is used for verifying the client between the server and client in the same manner as the server private key 42.

Figure 4D:
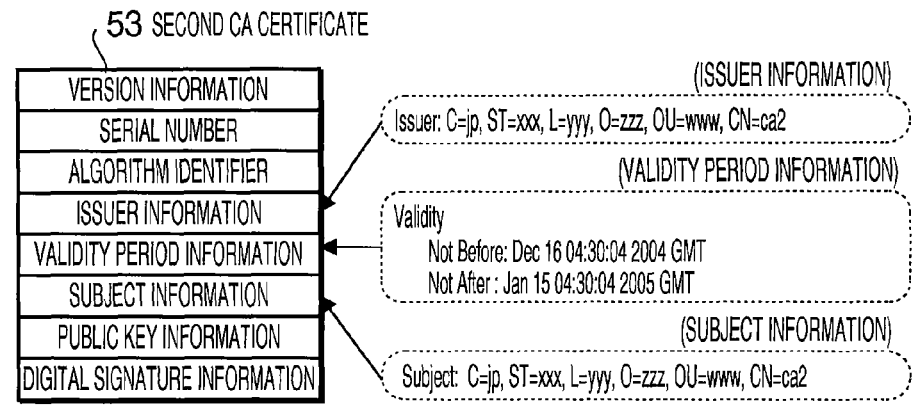

The second CA certificate 53 is a certificate for verifying the server certificate 41 signed by the second CA 22, has contests as shown in FIG. 4D. The second CA certificate 53 includes the same kinds of information as the server certificate 41. The second CA certificate 53 is configured to verify digital signature information of the server certificate 41 with a public key of the second CA 22 included in the second CA certificate 53, a validity period, and subject information so as to certificate the server (digital MFP 10).

The digital MFP 10 may have a plurality of CA certificates, and the aforementioned first CA certificate 43 is an example of the CA certificates of the digital MFP 10. Further, the PC 30 may have a plurality of CA certificates, and the aforementioned second CA certificate 53 is an example of the CA certificates of the PC 30.

The PC 30 uses a communication protocol such as an HTTP protocol when performing setting for the digital MFP 10 such as password setting and communication setting, printing, and scanning of a document. In this case, the PC 30 is provided with a program that is adapted to send information regarding a CA which has given a signature to the client certificate 51 thereof (namely, the first CA 21 in the embodiment) to the digital MFP 10 at the start of the communication in the case where a communication protocol that does not comply with encrypted communication is employed. It is noted that any information that can specify the first CA 21 may be acceptable as the above information regarding the first CA 21. For example, as shown in FIG. 8A, there may be written in a header of a request for an HTTP-based connection Cert-Issuer-Info header 61. However, the information regarding the first CA 21 is not limited to the example shown in FIG. 8A. For example, a specified value may be written in an expanded area of the client certificate 51. Namely, information regarding the first CA 21 may be written in addition to the information shown in FIG. 4B and sent.

Meanwhile, the digital MFP 10 is provided with a program adopted to extract the information regarding the first CA 21 sent by the PC 30 based on a communication protocol (first protocol) and search an electronic certificate (first CA certificate 43) of a CA (first CA 21) specified by the extracted information in a memory device (flash memory 14) thereof. Further, the digital MFP 10 is provided with a program that is adopted to send a command for instructing to redirect a port to one for a communication protocol (second protocol) that complies with the encrypted communication when having found the first CA certificate 43, and adopted to continue the communication based on the first protocol when having not found the first CA certificate 43 as a result of the searching operation. Additionally, the digital MFP 10 is provided with a program adopted not to continue but to break the communication based on the first protocol when the first CA certificate 43 has not been found and a request received from the client (PC 30) is a specified one that needs security. The specified request is, for example, a request for registration or change of a password.

Figure 3:
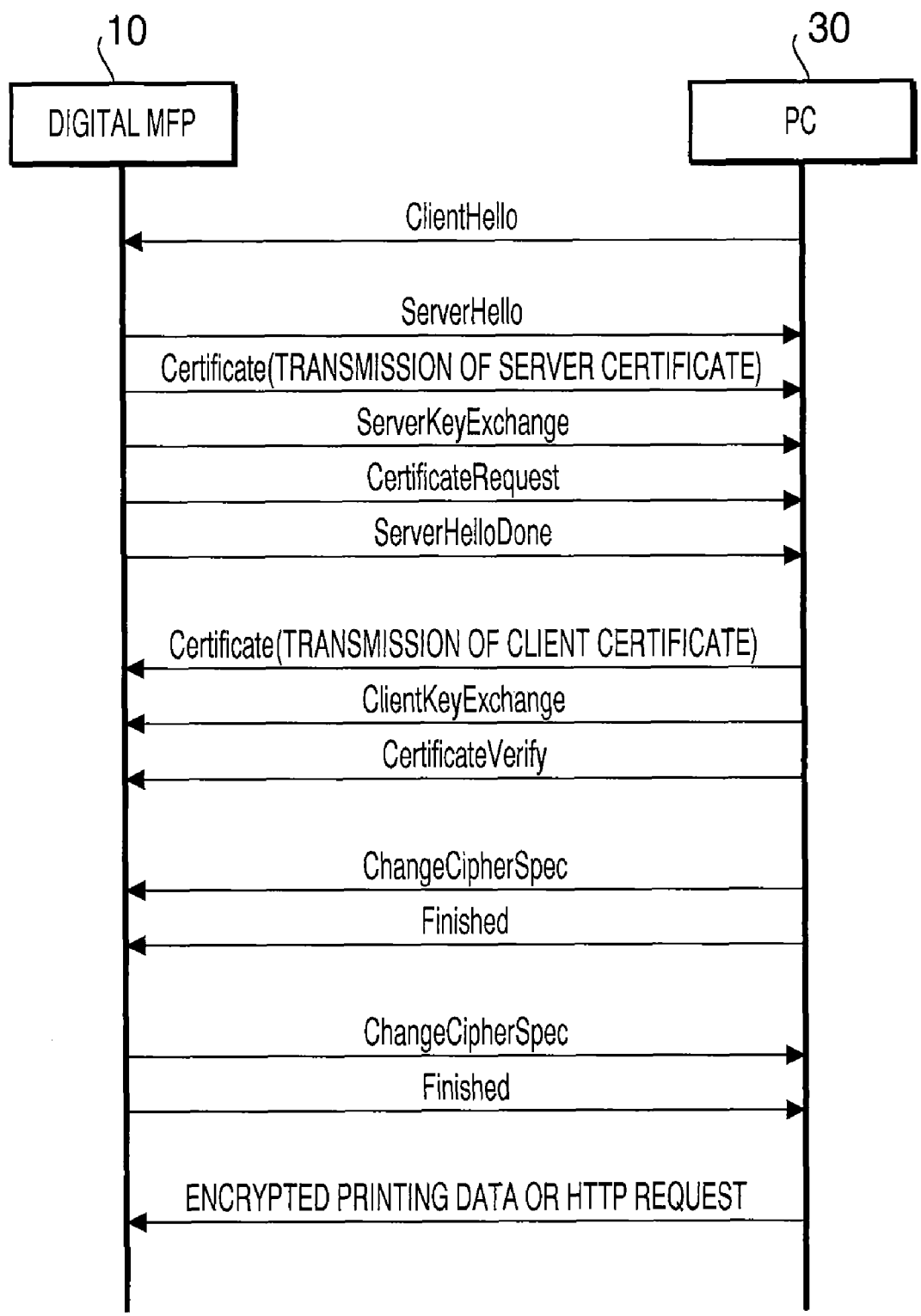
FIG. 3 is a ladder chart showing a procedure of an SSL handshake as a process to establish encrypted communication between a digital MFP (Multi Function Peripheral) and a PC in the embodiment according to one or more aspects of the present invention.

Next a procedure of the SSL encrypted communication in the embodiment. FIG. 3 is a ladder chart showing a procedure of an SSL handshake as a process to establish the encrypted communication between the digital MFP 10 and the PC 30. As shown in FIG. 3, the SSL handshake is started in response to a "ClientHello" message being sent from the client (PC 30) to the server (digital MFP 10). By the transmission of the "ClientHello" message, the digital MFP 10 is notified of the start of the communication and information necessary for the digital MFP 10 to perform the SSL communication with the PC 30.

When receiving the "ClientHello" message, the digital MFP 10 sends, to the PC 30, a "ServerHello" message including information necessary for the PC 30 to perform the SSL communication with the digital MFP 10 and a "Certificate" message including the server certificate 41. In addition, the digital MFP 10, as required, sends a "ServerKeyExchange" message to the PC 30.

Further, the digital MFP 10 sends a "CertificateRequest" message for requesting for the client certificate 51. Then after the messages have completely been transmitted, the digital MFP 10 sends, to the PC 30, a "ServerHelloDone" message representing the completed transmission of the messages.

On the other hand, when receiving the "ServerHelloDone" message, the PC 30 sends, to the digital MFP 10, a "Certificate" message including the client certificate 51 in response to the "CertificateRequest" message if it has been received before. Additionally, the PC 30 sends, to the digital MFP 10, a "ClientKeyExchange" message including a premaster secret necessary for generating a session key. Further, the "ClientExchange" message is sent in a state encrypted with a server public key of which the server certificate 41 has informed when it is to be sent. Furthermore, the PC 30 sends a "CertificateVerify" message.

Thereafter, the PC 30 sends, to the digital MFP 10, a "ChangeCipherSpec" message for informing of changing a cipher and a "Finished" message, encrypted with the session key, for informing that the handshake is completed.

On the other hand, when receiving the "Finished" message from the PC 30, the digital MFP 10 sends, to the PC 30, a "ChangeCipherSpec" message for informing of changing the cipher and a "Finished" message, encrypted with the session key, for informing that the handshake is completed. Thus, the server certificate 41 and client certificate 51 are sent and received between the digital MFP 10 and PC 30 to establish the SSL communication.

The digital MFP 10 and PC 30 break the communication when an error arises during the SSL handshake. In addition, the communication is interrupted when the digital MFP 10 fails to verify the received client certificate 51 with the first CA certificate 43, or when the PC 30 fails to verify the received server certificate 41 with the second CA certificate 53.

Figure 5:
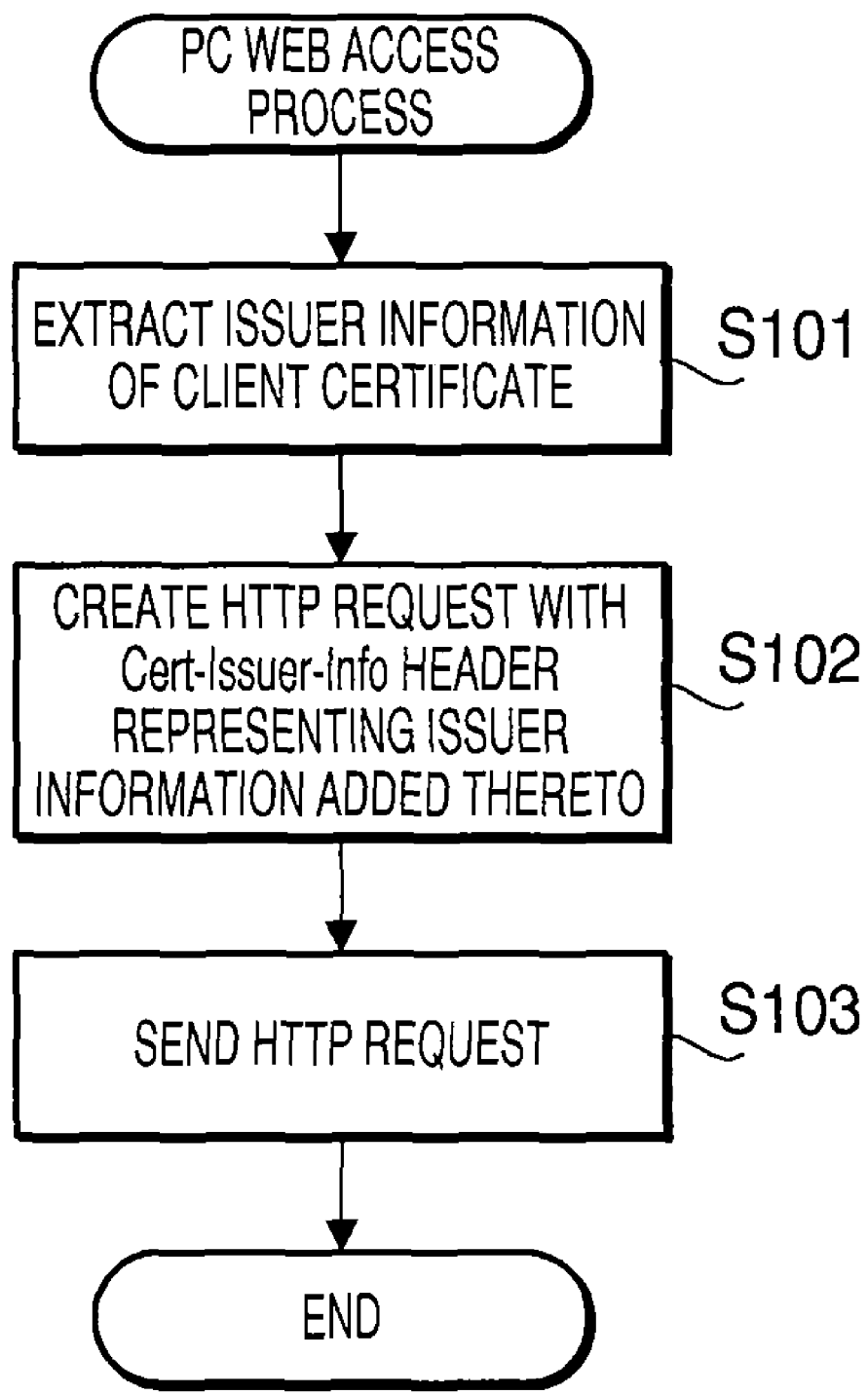
FIG. 5 is a flowchart showing a process to be executed when a web access to the digital MFP is performed by the PC in the embodiment according to one or more aspects of the present invention.

Next, there will be explained a process to be performed when the PC 30 starts the communication with the digital MFP 10 based on the first protocol. FIG. 5 is a flowchart showing a process to be executed when a web access to the digital MFP 10 is performed by the PC 30. The CPU 31 of the PC 30 extracts the issuer information from the information regarding the client certificate 51 stored in a storage device such as the HDD 34 (S101). Then, the CPU 31 generates an HTTP request. At this time, the Cert-Issuer-Info header 61 including the issuer information is created and added to the HTTP request (S102, see FIG. 8A). Thereafter, the generated HTTP request is transmitted to the digital MFP 10 (S103).

Figure 6:
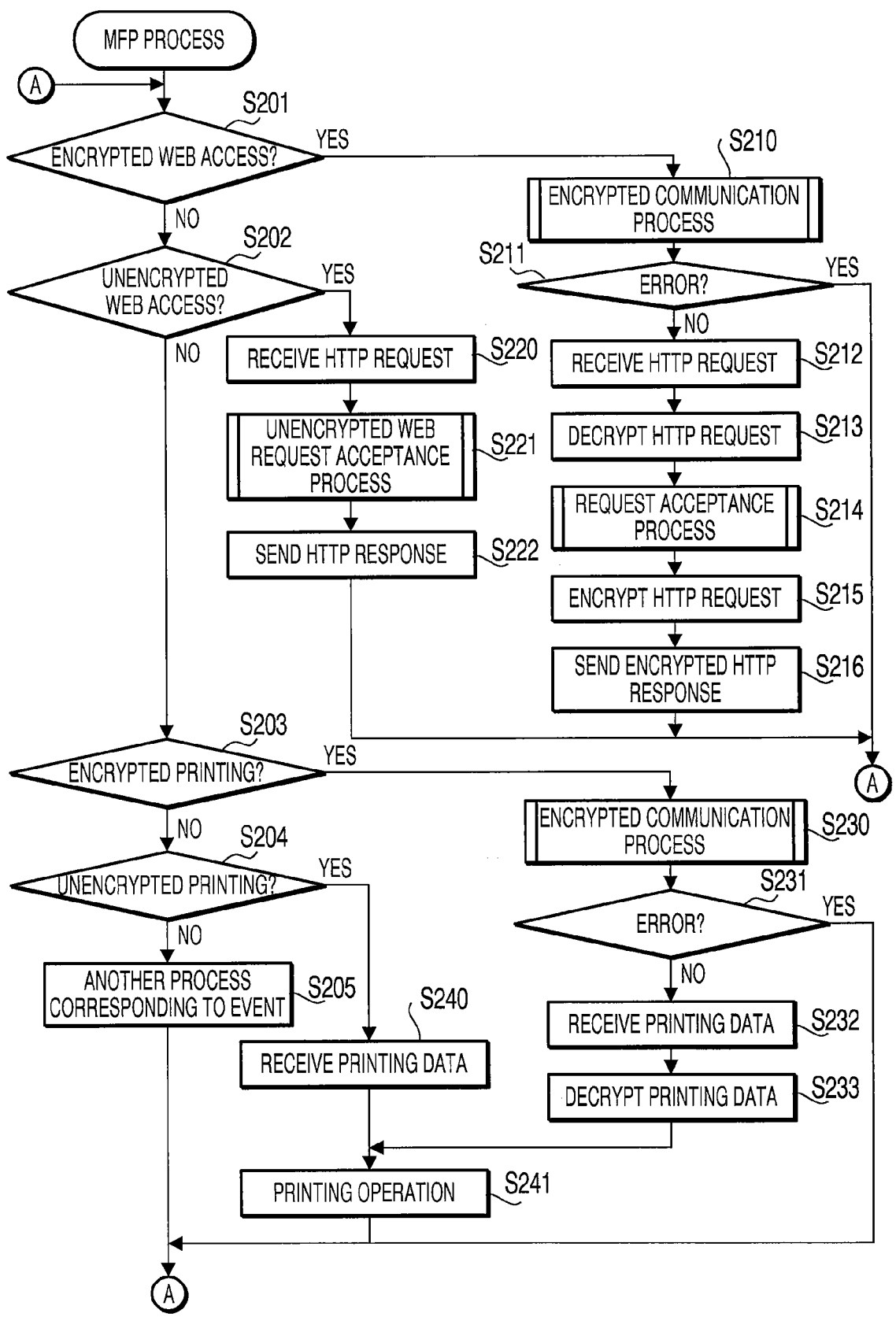
FIG. 6 is a flowchart showing a process to be executed by a CPU of the digital MFP in the embodiment according to one or more aspects of the present invention.

FIG. 6 is a flowchart showing a process to be executed by the CPU 11 of the digital MFP 10. As shown in FIG. 6, the CPU 11 analyzes the HTTP request received from the PC 30 to judge whether an event that has arisen is a request for an encrypted web access (S201), a request for an unencrypted web access (S202), a request for an encrypted printing (S203), or a request for an unencrypted printing (S204). When the event that has arisen is one of the aforementioned events, the CPU 11 performs a process corresponding to the one of the aforementioned events. Meanwhile, when the event that has arisen is not any of the aforementioned events (S201: No, S202: No, S203: No, and S204: No), the process goes to a step S205, in which the CPU 11 performs one of other processes corresponding to the event that has arisen. The judgments in the steps S201 to S204 are made by appropriately referring to a communication protocol and/or port being used, and/or an accessed URI.

When the event that has arisen is judged to be the request for the encrypted web access (S201: Yes) (for example, when the PC 30 accesses a setting page of the digital MFP 10 through an HTTPS port 443), the CPU 11 begins an encrypted communication process (S210). In the encrypted communication process, the aforementioned SSL handshake is performed, and the client certificate 51 is verified with the first CA certificate 43. When an error arises in the verification (S211: Yes), the communication is interrupted.

When the verification of the client certificate 51 is successful (S211: No), the process goes to a step S212, in which the CPU 11 receives the HTTP request from the PC 30. Then, the HTTP request is decrypted with the session key (S213). Thereafter, there is performed a process to comply with the HTTP request, for example, a process of creating screen image data for communication setting and password setting for the digital MFP 10 as an HTTP response (request acceptance process in a step S214). Subsequently, the HTTP response is encrypted with the session key (S215) and sent to the PC 30 (S216).

When the event that has arisen is judged to be the request for the unencrypted web access in the step S202 (S202: Yes) (for example, when the PC 30 accesses a setting page of the digital MFP 10 through an HTTP port 80), the CPU 11 receives the HTTP request (S220), and performs an unencrypted web request acceptance process (S221). The unencrypted web request acceptance process will be described with reference to FIG. 7.

Figure 7:
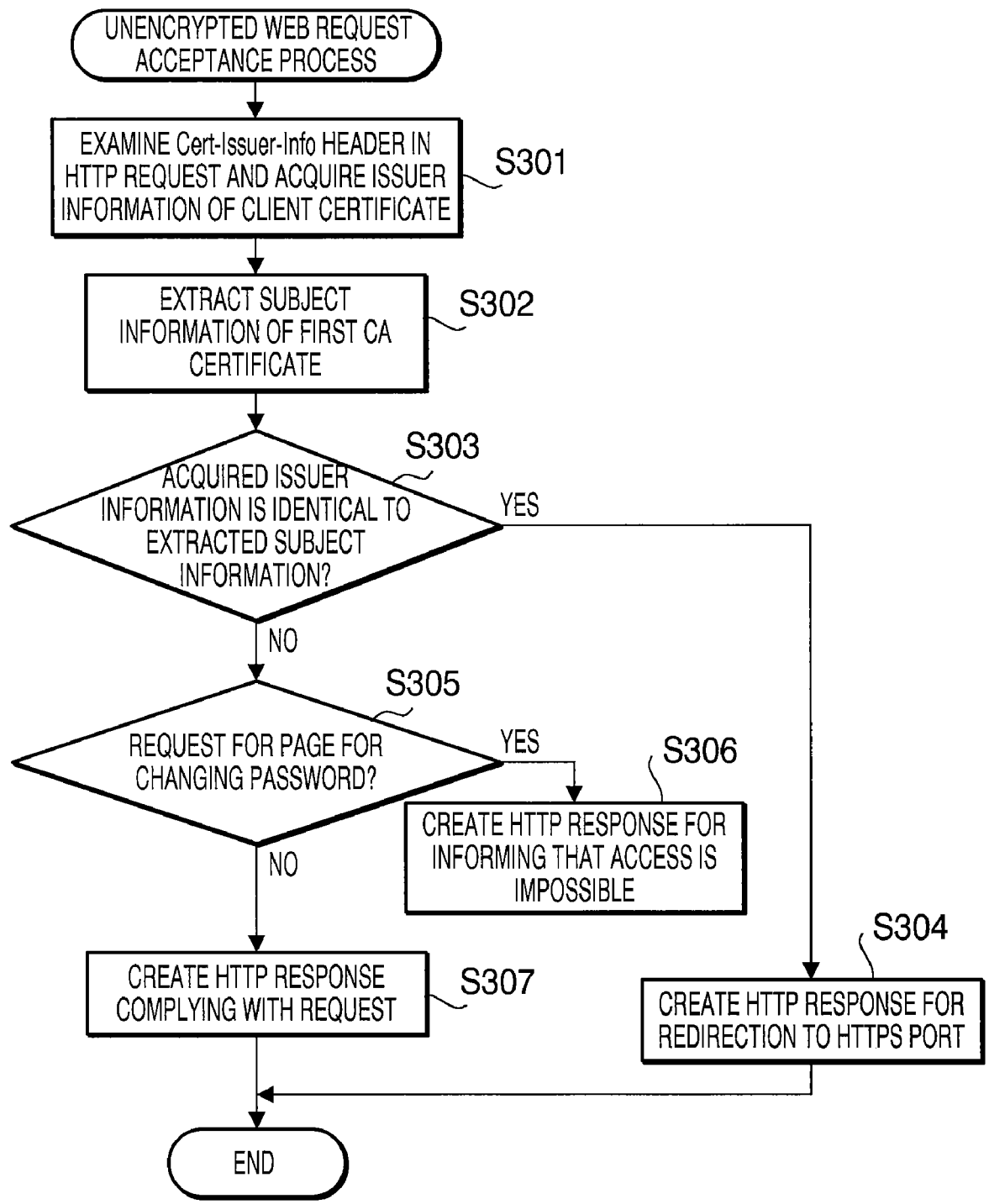
FIG. 7 is a flowchart showing an unencrypted web request acceptance process in the embodiment according to one or more aspects of the present invention.

FIG. 7 is a flowchart showing the unencrypted web request acceptance process. The CPU 11 examines the Cert-Issuer-Info header 61 included in the HTTP request received from the PC 30 and acquires the issuer information of the client certificate 51(S301). Then, the CPU 11 examines the first CA certificate 43 stored in the flash memory 14 and extracts the subject information (S302). In a step S303, it is judged whether the acquired issuer information of the client certificate 51 is identical to the extracted subject information of the first CA certificate 43. When it is judged that the issuer information of the client certificate 51 is identical to the subject information of the first CA certificate 43, namely, that the issuer information of the client certificate 51 and the subject information of the first CA certificate 43 represent the same CA (S303: Yes), it means that the PC 30 is allowed to communicate with the digital MFP 10 based on the second protocol through a port complying with the second protocol. Therefore, the CPU 11 creates an HTTP response for redirection to the HTTPS port 443 (S304). An HTTPS address is to be written as a redirected access destination URI 62 in the HTTP response as shown in FIG. 8B.

Meanwhile, When it is not judged that the issuer information of the client certificate 51 is identical to the subject information of the first CA certificate 43 (S303: No), it is judged whether the request is one for a page for changing a password (S305). When it is judged that the request is one for a page for changing a password (S305: Yes), the CPU 11 breaks the communication through the HTTP port 80 so as to assure the security, and creates an HTTP response for informing that the access is impossible (S306).

Meanwhile, when it is not judged that the request is one for a page for changing a password (S305: No), the CPU 11 maintains the communication through the HTTP port 80 and creates an HTTP response complying with the request (S307).

Referring back to FIG. 6, in a step S222, the CPU 11 transmits the HTTP response created in the unencrypted web request acceptance process in the step S221. When receiving the command for redirection, the PC 30 accesses the redirected access destination URI 62 through the HTTPS port 443 in response to the command. Thereafter, since the process enters a flow (S210 to S216) for the encrypted web access, secure communication can be performed. Meanwhile, the PC 30 continues the communication based on the protocol before the redirection.

When the event that has arisen is the request for the encrypted printing (S203: Yes) (for example, when a GET header URI of HTTP data, obtained by decrypting encrypted HTTP data received through the HTTPS port 443, is a printing URI (e.g., /print/)), it is judged that IPP-based communication on the HTTPS-based communication is required, and the encrypted communication process is performed in the same manner as the step S210 (S230). When an error arises in the verification of the encrypted communication process (S231: Yes), the communication is interrupted. Meanwhile, when the verification is successful (S231: No), the process goes to a step S232, in which the CPU 11 receives printing data from the PC 30. Then, the CPU 11 decrypts the received printing data with the session key (S233), and controls the printing unit 16 to perform a printing operation based on the decrypted printing data (S241).

In the meantime, when the event that has arisen is the request for the unencrypted printing (S204: Yes) (for example, when a GET header URI of HTTP data received through the HTTP port 80 is a printing URI (e.g., /print/)), it is judged that IPP communication is required. Then, the CPU 11 receives printing data (S240), and controls the printing unit 16 to perform the printing operation based on the received printing data (S241).

Thus, according to the digital MFP 10 in the embodiment, the web access and printing operation can be performed. In the case of the printing operation, data communication is completed only in a single step. Therefore, since higher priority is put on executing the printing operation rather than assuring high-security communication in the embodiment, the communication is maintained to perform the printing operation when the request for the unencrypted printing is received. Namely, since it is controlled whether to issue the command for the redirection depending on the events arising in the communication, when the event is the request for printing, the communication based on the first protocol is maintained without issuing the command for the redirection to the client (PC 30). However, in the printing operation, the same process as the unencrypted web request acceptance process in the step S221 may be performed in the same manner as the case of the web access. In this case, the CPU 11 examines the information regarding the CA (e.g., the Cert-Issuer-Info header 61) included in the printing data to acquire the issuer information of the client certificate 51. Then, the CPU 11 searches the first CA certificate 43 stored in the flash memory 14, and checks the subject information thereof. When the issuer information of the client certificate 51 is identical to the subject information of the first CA certificate 43, the CPU 11 creates the HTTP response for the redirection to the HTTPS port 443. Meanwhile, when the issuer information of the client certificate 51 is not identical to the subject information of the first CA certificate 43, the printing is performed with the communication through the HTTP port 80 being maintained. Such configuration can attain higher-security communication.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

For example, although the communication system 1 is configured with the digital MFP 10 as a server and the PCs 30 as clients in the aforementioned embodiment, the communication system 1 may be configured with other communication devices as a server or clients. For instance, a television, server computer, or hard disk recorder may be a server or client. Further, a mobile phone may be a client. Additionally, although the HTTP and HTTPS are exemplified as an unencrypted communication protocol and an encrypted communication protocol, respectively, other protocols such as an LPR and an SNMP v1 may be used as unencrypted communication protocols, and other protocols such as an SNMP v3 may be used as encrypted communication protocols.

In the aforementioned embodiment, when a client's requirement is to change the password, the communication related to the required process is performed with the encrypted communication, while the communication is interrupted in the case where the encrypted communication is impossible. However, such configuration can be applied to a case of registering the password such as initial registration of a password for subscribing.

In the aforementioned embodiment, there has been exemplified a case where a single piece of information regarding the first CA is transmitted as the information regarding the first CA (see FIG. 8A). However, it is desired that a plurality of pieces of information regarding the first CA are transmitted so as to establish higher-security communication.

In the aforementioned embodiment, there has been exemplified a case where each of the server and client uses the certificate (the server certificate 41 or client certificate 51) issued by the CA separate from itself. However, each of the server and client may be provided with a role of a CA. For example, the second CA 22 and the digital MFP 10 may be configured as a single apparatus.

Further, the server may be configured to control communication to be performed after judgment that the communication based on the second protocol is impossible depending on requests from the client through the communication based on the first protocol. For example, when it is judged that the communication based on the second protocol is impossible, the communication to be performed thereafter based on the first protocol may also be prohibited in the case of receiving a command (communication request) from an application dealing with confidential information. Meanwhile, the communication based on the first protocol may be permitted in the case where the received command has not been issued from an application dealing with confidential information. In this case, the client may be configured to separately store applications dealing with confidential information and the other applications. Alternatively, the client may be configured to store each application with a flag representing whether it deals with confidential information being set. The server may be configured to discriminate the applications with a URI accessed by the client or a port used by the client. Thereby, the communication of the confidential information can be performed based on the high-security protocol.

Furthermore, each application may be stored not only with indicating whether information to be dealt with is confidential but also with indicating a confidential level of the information. In this case, it is desired that the user can determine the confidential level. For example, the server may have a predetermined confidential level stored therein. When receiving a request for communication of information of a lower confidential level than the predetermined confidential level, the server may maintain the communication based on the first protocol even though the server does not store, in the storage device thereof, an electronic certificate of a CA corresponding to information regarding the CA sent by the client. Meanwhile, when receiving a request for communication of information of a higher confidential level than the predetermined confidential level, the server may prohibit the communication based on the first and second protocols in the case where the server does not store, in the storage device thereof, an electronic certificate of a CA corresponding to information regarding the CA sent by the client.

What is claimed is:

1. A communication system, comprising a server and at least one client, the communication system being configured to establish, between the server and the at least one client, a first communication based on a first protocol and a second communication based on a second protocol with higher security than the first protocol, wherein the server comprises a server-side processor configured to control:
an information receiving unit which receives first information for judging feasibility of the second communication from the at least one client via the first communication based on the first protocol, before establishment of the second communication;
an information extracting unit which extracts second information for judging the feasibility of the second communication from information stored in the server, before establishment of the second communication;
a judging unit which judges whether the second communication between the server and the at least one client is feasible based on the first information and the second information, before establishment of the second communication;
a command sending unit which sends, to the at least one client via the first communication, a command to send a request for establishing the second communication when the judging unit judges that the second communication between the server and the at least one client is feasible based on the received first information and the extracted second information, before establishment of the second communication; and
a first-communication maintaining unit which maintains the first communication unless the judging unit judges that the second communication between the server and the at least one client is feasible based on the received first information and the extracted second information,
wherein each of the at least one client comprises a client-side processor configured to control:
an information sending unit which sends the first information to the information receiving unit via the first communication;
a command receiving unit which receives the command sent by the command sending unit; and
a request sending unit which sends, to the server, the request for establishing the second communication in response to the command received by the command receiving unit,
wherein the first information comprises issuer information of a client certificate stored in the at least one client, the issuer information representing an issuer of the client certificate who has given a digital signature,
wherein the second information comprises subject information of a CA (Certificate Authority) certificate, stored in the server, for verifying the client certificate, the subject information representing an owner of the CA certificate,
wherein the judging unit is configured to judge whether the issuer information of the client certificate is identical to the subject information of the CA certificate for verifying the client certificate, and
wherein the command sending unit is configured to send, to the at least one client, with the server, the command to instruct to send the request for establishing the second communication when the judging unit judges that the issuer information of the client certificate is identical to the subject information of the CA certificate for verifying the client certificate.

2. The communication system according to claim 1, wherein the server further comprises:
a determining unit configured to determine whether the request for establishing the second communication that is received from the at least one client is a specified one that needs high-security communication unless the judging unit judges that the second communication between the server and the at least one client is feasible; and
a control unit configured to prohibit the first communication based on the first protocol using the server when the determining unit determines that the request received from the at least one client is a specified one that needs high-security communication.

3. The communication system according to claim 2, wherein the control unit maintains the first communication based on the first protocol using the server unless the determining unit determines that the request received from the at least one client is a specified one that needs high-security communication.

4. The communication system according to claim 3, wherein the server further comprises a printing unit,
wherein the determining unit determines whether the request received from the at least one client is a request for printing unless determining that the request is a specified one that needs high-security communication, and
wherein the control unit controls the printing unit to perform a printing operation through the first communication based on the first protocol when the determining unit determines that the request is a request for printing.

5. The communication system according to claim 2, wherein the determining unit is configured to determine whether a request received from the at least one client is a request for one of registration and change of a password unless the judging unit judges that the second communication between the server and the at least one client is feasible, and
wherein the control unit is configured to prohibit the first communication based on the first protocol using the server when the determining unit determines that the request received from the at least one client is a request for one of registration and change of a password.

6. The communication system according to claim 1, wherein the first information comprises a plurality of pieces of information for judging feasibility of the second communication, and
wherein the judging unit judges whether the second communication between the server and the at least one client is feasible based on at least one of the plurality of pieces of information of the first information and second information.

7. A server usable in a communication system configured to establish, between the server and at least one client, a first communication based on a first protocol and a second communication based on a second protocol with higher security than the first protocol, the server comprising a server-side processor configured to control:
an information receiving unit which receives first information for judging feasibility of the second communication from the at least one client via the first communication based on the first protocol, before establishment of the second communication;
an information extracting unit which extracts second information for judging the feasibility of the second communication from information stored in the server, before establishment of the second communication;
a judging unit which judges whether the second communication between the server and the at least one client is feasible based on the first information and the second information, before establishment of the second communication;

a command sending unit configured to send, to the at least one client via the first communication, a command to send a request for establishing the second communication when the judging unit judges that the first information is identical to the second information based on the received first information and the extracted second information, before establishment of the second communication; and a first-communication maintaining unit which maintains the first communication unless the judging unit judges that the second communication between the server and the at least one client is feasible based on the received first information and the extracted second information, wherein the first information comprises issuer information of a client certificate stored in the at least one client, the issuer information representing an issuer of the client certificate who has given a digital signature, wherein the second information comprises subject information of a CA (Certificate Authority) certificate, stored in the server, for verifying the client certificate, the subject information representing an owner of the CA certificate, wherein the judging unit is configured to judge whether the issuer information of the client certificate is identical to the subject information of the CA certificate for verifying the client certificate, and wherein the command sending unit is configured to send, to the at least one client via the first communication, the command to send the request for establishing the second communication when the judging unit judges that the issuer information of the client certificate is identical to the subject information of the CA certificate for verifying the client certificate.

8. The server according to claim 7, further comprising:

a determining unit configured to determine whether the request for establishing the second communication that is received from the at least one client is a specified one that needs high-security communication unless the judging unit judges that the second communication between the server and the at least one client is feasible; and a control unit configured to prohibit the first communication based on the first protocol using the server when the determining unit determines that the request received from the at least one client is a specified one that needs high-security communication.

9. The server according to claim 8, wherein the control unit maintains the first communication based on the first protocol using the server unless the determining unit determines that the request received from the at least one client is a specified one that needs high-security communication.

10. The server according to claim 9, wherein the server further comprises a printing unit, wherein the determining unit determines whether the request received from the at least one client is a request for printing unless determining that the request is a specified one that needs high-security communication, and wherein the control unit controls the printing unit to perform a printing operation through the first communication based on the first protocol when the determining unit determines that the request is a request for printing.

11. The server according to claim 8, wherein the determining unit is configured to determine whether a request received from the at least one client is a request for one of registration and change of a password unless the judging unit judges that the second communication between the server and the at least one client is feasible, and wherein the control unit is configured to prohibit the first communication based on the first protocol using the server when the determining unit determines that the request received from the at least one client is a request for one of registration and change of a password.

12. The server according to claim 7, wherein the first information comprises a plurality of pieces of information for judging feasibility of the second communication, and wherein the judging unit judges whether the second communication between the server and the at least one client is feasible based on at least one of the plurality of pieces of information of the first information and second information.

13. A non-transitory computer usable medium comprising computer readable instructions stored thereon that cause a server to establish a first communication with at least one external device based on a first protocol and a second communication with the at least one external device based on a second protocol with higher security than the first protocol, wherein the computer readable instructions cause the server to perform steps of:

receiving first information for judging feasibility of the second communication from the at least one external device via the first communication based on the first protocol, before establishment of the second communication;

extracting second information for judging the feasibility of the second communication from information stored in the server, before establishment of the second communication;

judging whether the second communication between the server and the at least one external device is feasible based on the first information and the second information, before establishment of the second communication;

sending, to the at least one external device via the first communication, a command to send a request for establishing the second communication when it is judged that the second communication between the server and the at least one external device is feasible based on the received first information and the extracted second information, before establishment of the second communication, and maintaining the first communication unless the judging unit judges that the second communication between the server and the at least one external device is feasible based on the received first information and the extracted second information, wherein the first information comprises issuer information of a client certificate stored in the at least one external device, the issuer information representing an issuer of the client certificate who has given a digital signature, wherein the second information comprises subject information of a CA (Certificate Authority) certificate, stored in the server, for verifying the client certificate, the subject information representing an owner of the CA certificate, wherein the judging step comprises a step of judging whether the issuer information of the client certificate is identical to the subject information of the CA certificate for verifying the client certificate, and wherein the sending step comprises a step of sending, to the at least one external device, with the server, the command to instruct to send the request for establishing the second communication when it is judged that the issuer information of the client certificate is identical to the subject information of the CA certificate for verifying the client certificate.

14. The non-transitory computer usable medium according to claim 13,
wherein the computer readable instructions cause the server to perform further steps of:
determining whether the request for establishing the second communication that is received from the at least one external device is a specified one that needs high-security communication unless it is judged that the second communication between the server and the at least one external device is feasible; and
prohibiting the first communication based on the first protocol using the server when it is determined that the request received from the at least one external device is a specified one that needs high-security communication.

15. The non-transitory computer usable medium according to claim 14,
wherein the computer readable instructions cause the server to perform a further step of maintaining the first communication based on the first protocol using the server unless it is determined in the determining step that the request received from the at least one external device is a specified one that needs high-security communication.

16. The non-transitory computer usable medium according to claim 15,
wherein the determining step comprises a step of determining whether the request received from the at least one external device is a request for printing unless it is determined that the request is a specified one that needs high-security communication, and
wherein the computer readable instructions cause the server to perform a further step of performing a printing operation through the first communication based on the first protocol when it is determined in the determining step that the request is a request for printing.

17. The non-transitory computer usable medium according to claim 14,
wherein the determining step comprises a step of determining whether a request received from the at least one external device is a request for one of registration and change of a password unless it is judged that the second communication between the server and the at least one external device is feasible, and
wherein the prohibiting step comprises a step of prohibiting the first communication based on the first protocol using the server when it is determined that the request received from the at least one external device is a request for one of registration and change of a password.

* * * * *